US007437672B2

(12) United States Patent
Myers

(10) Patent No.: US 7,437,672 B2
(45) Date of Patent: *Oct. 14, 2008

(54) COMPUTER-BASED METHOD FOR CONVEYING INTERRELATED TEXTUAL NARRATIVE AND IMAGE INFORMATION

(76) Inventor: Robert T. Myers, 639 Huntley Dr., #4, West Hollywood, CA (US) 90069

( * ) Notice: Subject to any disclaimer, the term of this patent is extended or adjusted under 35 U.S.C. 154(b) by 274 days.

This patent is subject to a terminal disclaimer.

(21) Appl. No.: 11/093,136

(22) Filed: Mar. 29, 2005

(65) Prior Publication Data

US 2005/0172231 A1 Aug. 4, 2005

Related U.S. Application Data

(63) Continuation of application No. 10/160,591, filed on May 31, 2002, now Pat. No. 6,892,352.

(51) Int. Cl.
*G06F 13/00* (2006.01)
*G06F 15/00* (2006.01)

(52) U.S. Cl. .................... 715/719; 715/723

(58) Field of Classification Search .............. 715/719, 715/723, 707, 726, 714, 825, 818
See application file for complete search history.

(56) References Cited

U.S. PATENT DOCUMENTS 6,369,835 B1 * 4/2002 Lin ........................ 715/726
6,697,569 B1 * 2/2004 Gomez et al. ............ 386/120

\* cited by examiner

*Primary Examiner*—Cao "Kevin" Nguyen
(74) *Attorney, Agent, or Firm*—Lisa A. Karczewski; Chan Law Group LLP

(57) ABSTRACT

A computer-based method and device for conveying interrelated image and narrative information, suitable for use with a variety of types of information ranging from product information and maintenance procedures to cooking recipes, game commentaries, and travel guides. The first component of the device is an authoring environment used to specify images, narrative text, and interrelationships between elements of each. A second component is a conversion device that prepares the authored materials for viewing. The third component of the device is a delivery or run-time system, capable of being implemented in a standard World-Wide Web browser, which interacts with an end-user to present the information in an integrated fashion, such as by displaying or highlighting relevant portions of the image when the related portion of the narrative text is accessed and vice versa.

1 Claim, 6 Drawing Sheets

```
<game ID='correct_joseki_1' title="Usual joseki (1)">
<moveref href='#main(13)'/>
   <m x='14' y='2' c='1'/>
   <m x='15' y='2' c='0'/>
   <m x='10' y='2' c='1'/>
   <m x='16' y='4' c='0'/>
</game>

<game ID='correct_joseki_2' title="Usual joseki (2)">
<moveref href='#main(13)'/>
   <m x='16' y='2' c='1'/>
   <m x='14' y='2' c='0'/>
   <m x='16' y='3' c='1'/>
   <m x='12' y='2' c='0'/>
</game>
```

FIG 2

```
<p>
<var id='20bango-02.xsgf#correct_joseki_1'>
  <m><c>The <oshi/> in towards the corner would be the usual way</c>.</m>
  <mg n='3'><c> This sequence gives <W/> sente and <B/> the corner</c>.</mg>
</var>

<var id='20bango-02.xsgf#correct_joseki_2'>
  <m><c>Another alternative is the <san-san/>, which leads to a</c></m>
  <mg n='3'>
    <c>a sequence which gives <W/> the corner and <B/> the outside.
       Again, both sides are reasonably content.
    </c>
  </mg>
<c>Either move is preferable to the one played in the game.</c>
</var>

```
<script>
        rt.push_var ("20bango-02.xsgf#correct_joseki_1");
</script>

<script>rt.m_in ();</script>
        The <i>oshi</i> in towards the corner would be the usual way.
<script>rt.m_out();</script>

<script>rt.mg_in(3);</script>
        This sequence gives White sente and Black the corner.
<script>rt.mg_out();</script>

<script>
        rt.pop_var ();
</script>

<script>
        rt.push_var ("20bango-02.xsgf#correct_joseki_2");
</script>

<script>rt.m_in ();</script>
        Another alternative is the <i>san-san</i>, which leads to
<script>rt.m_out();</script>

<script>rt.mg_in(3);</script>
        a sequence which gives White the corner and Black the outside.
Again, both sides are reasonably content.

<script>rt.mg_out();</script>

Either move is preferable to the one played in the game.

<script>
        rt.pop_var ();
</script>
```

FIG 4

COMPUTER-BASED METHOD FOR CONVEYING INTERRELATED TEXTUAL NARRATIVE AND IMAGE INFORMATION

CROSS-REFERENCE TO RELATED APPLICATIONS

This Application is a continuation of U.S. application Ser. No. 10/160,591, filed May 31, 2002 now U.S. Pat. No. 6,892,352. This Application claims priority of copending U.S. application Ser. No. 10/160,591, filed May 31, 2002.

STATEMENT REGARDING FEDERALLY SPONSORED RESEARCH OR DEVELOPMENT

Not Applicable

REFERENCE TO A MICROFICHE APPENDIX

Not Applicable

FIELD OF INVENTION

The present invention relates to the computer-based conveyance of information, and more particularly the presentation of interrelated narrative text and image information.

BACKGROUND OF THE INVENTION

Reading a single, well-organized text narrative is a common means of conveying information. It is also common to combine images with that text to convey information more effectively to the reader. Many books, encyclopedias, and on-line documents, primarily narrative in nature, contain images illustrating the topic of discussion, and conversely, some form of text accompanies the images.

In the printed medium, references from the narrative to the image are expressed within the text, and references from the image to the narrative are expressed as annotations to the image. Consequently, a heavy burden is placed on the reader to redirect his attention from one element (image or narrative) to the other and back again. This slows the process of absorbing and understanding the information.

Further, the printed medium does not provide a way within a single image to animate that image, for example, changes in the image over time, different aspects of the image, or alternative versions of the image. Printed materials therefore present separate images for each temporal instance, aspect, or variance of the image. This wastes space and provides less information to the reader.

Computer-based media, particularly the Internet, deliver increasingly large amounts of information. A sizable portion of this information concerns topics that are best presented using a blend of text and image or graphical media. Prior art methods for presenting such information involve the same approach as described above for printed media. A second prior art method, specific to computer-based media in general and the Internet, places "hyperlinks" within the text or image. When activated, the hyperlinks "jump" the reader to a related text or image. However, this second method suffers from three substantial problems. First, it is usually impossible to jump to a particular element of a graphic or image. Second, jumping to text is at the page or at best paragraph level. Third, the jump itself interrupts the continuity of information delivery to the reader, then interrupts again by forcing the reader to jump a second time to return to the original information.

Computers have long supported the display of animated images. Internet browsers also support animation through the inclusion of "add-on" or "plug-in" software such as MACROMEDIA FLASH (computer software for creating animation, sound, graphics, presentations, and illustrations; computer software for viewing and playing animation, sound, graphics, presentations, and illustrations; computer software for use in authoring for the web; computer software for enhancing the capabilities of web browser software), or by coding custom applications for embedding in a web page which are typically written using the JAVA (computer programs for use in developing and executing other computer programs on computers, computer networks, and global communications networks, and instruction manuals sold therewith; computer programs for use in navigating, browsing, transferring information, and distributing and viewing other computer programs on computers, computer networks and global communications networks) computer language. The requirement of specialized browser add-ons is inconvenient, and in certain environments, totally inapplicable. More important, these approaches do not provide the ability to finely synchronize individual image elements with text elements, thus denying the reader an integrated information experience.

News organizations publish interactive maps and diagrams on the Internet. In this type of map or diagram the text and image information do not interact, and no single coherent narrative is available for reading or listening. "Headline" or "pop-up text" approaches replace the single narrative approach with snippets and bullets of text, but do not cohere to create a story. For instance, there is no narrative that can be read aloud to a sight-impaired user using text-to-voice technology.

The Synchronized Multimedia Integration Language (SMIL, pronounced "smile") claims to enable simple authoring of "rich media"/multimedia presentations that integrate streaming audio and video with images, text or any other media type. SMIL is a language, not a method or device. SMIL synchronizes in time, the image, sound, and text components of a presentation. SMIL, although supporting text, treats it primarily as "headlines" to be flashed at the reader during the viewing of images. SMIL does not provide the precise detail needed for the interrelationship between text and image required for certain types of applications.

An Internet consortium initiative known as Structured Vector Graphics (SVG) provides two approaches for animating or interacting with the graphics it defines. In the first approach, statements within the language itself define the animation that is to occur, such as with the <animate>element. The second is to manipulate the SVG objects by means of a scripting language. Although this permits a variety of effects and applications, SVG is primarily a graphics definition language and by itself does not provide the fine detail of interrelationship between text and image required for certain types of applications.

Apple Computer has developed a user-assistance system called "AppleGuide". The objective of AppleGuide is to provide the user with information on how to use his computer, similar to a "help system". AppleGuide displays a narrative text; the user then accesses a portion of that text and is informed of specific actions to take by a fat red circle around the relevant location on the computer screen. This system solves the problem of linking elements of text to elements of image, but only for the limited purpose where the image is that of an actual computer screen displaying user commands.

Also, this system does not provide support in the "reverse" direction, from the relevant image to the corresponding portion of the narrative.

A standard is currently emerging for electronic books or "e-books" and is used primarily for reading e-books on portable viewers. This standard defines the structure for e-books and an XML-based language for encoding them. It also permits graphics to be defined as part of the book by using typical web-based graphics encoding such as GIF and PNG. However, it does not provide any ability to interrelate text and graphics other than the normal web-based hyperlink.

An example of information that involves both text and image is a cooking recipe. A traditional recipe lists the ingredients, followed by a sequence of steps describing how to prepare, combine, or cook the ingredients. Images are limited to pictures of the finished dish, or diagrams of how to perform individual steps. The reader must transform the text into a mental model to carry out the preparation of the recipe, usually repeatedly consulting the text in order to verify or refresh the information. The efficiency of conveying the information in the recipe to the human brain is thus very low. Some prior art exists using flowcharts to graphically depict steps in food preparation. This approach is deficient in that it fails to use easily understandable visual icons, does not allow the presentation of multiple paths of preparation, and is focused on food safety issues. Cooking recipes can be presented effectively with interrelated narrative text and images.

Tourism information is another example of the use of both text and image. A plethora of material is available to tourists regarding places of interest to visit while traveling. The majority of these materials are in the form of printed books, although information is also available on the Internet and other computer-based media. The prior art of placing text next to images has been employed for conveying travel information. Historically information was presented on the printed page and more recently on the Internet, yet these methods of presentation are inefficient. For instance, the narrative may describe a particular walking tour of Seville, discussing various sites on the tour while referring to an accompanying map. The reader must constantly refer back and forth between the map and the text, looking on the map for sites mentioned in the narrative, or looking within the narrative for the description of sites on the map. Tourism information can be presented more effectively with interrelated narrative text and images.

Weather reports are an excellent example of information that involves both narrative and image. The image in this case is the weather map. Conceptually, a location mentioned in the narrative interlinks to the location shown on the map. The same applies to meteorological features such as weather fronts. Printed media, such as newspapers, present a narrative weather report accompanied by a map, however, newspapers fail to provide the reader with any assistance in linking the narrative report with the map. Weather information conveyed over the Internet typically gives an on-line narrative report accompanied by a map, which often includes animation showing the movement of storms and weather fronts over a period of time. Here again, text and images are treated as separate, static objects, forcing the reader to continually bounce back and forth between text and image in order to digest the information.

A huge amount of material has been published regarding games, including card and board games such as chess, bridge, and "igo", an Asian strategy board game. These materials are a prime example of information having a visual (image) and a verbal (textual or narrative) component.

Typically such materials employ images of the board together with text to provide information about the sequence of moves, or in the case of card games, cards that have been played. The sequence of moves actually played in a game, or variations that might have been played, are displayed along with a commentary on the sequence. These materials also show board positions representing problems for the player to solve along with the successful and unsuccessful solutions to those problems. Historically, such materials were published in books and magazines. A major weakness of the print medium for board game information is that board positions can only be shown statically. Any sequence of moves must be shown by numbers or letters on the board, with moves then referred to in the accompanying narrative using those numbers or letters.

A number of specialized computer applications are available which allow a sequence of moves in a board game, as well as variations, to be shown in animated fashion on a computer. Often these applications take as input files in the "SGF" format for the game "igo", and the "PBN" (Portable Bridge Notation) format for chess and bridge, which were developed to encode move sequence and variation information in computer-readable form. Some applications also display short commentaries on any move or position for which a commentary is available in the SGF or other file. Classic examples are SmartGo, an SGF editor and viewer and, more recently CGoban2, a SGF editor and viewer that functions as a client for users playing each other via the Kiseido Go Server. However, these applications are deficient as solutions to the problem of computer-based board game information display in that they are separate applications, must be created separately for each computer platform, and may require complex installation and configuration procedures. They are also primarily oriented to board display and do not represent a useful delivery mechanism for text-oriented commentary on board game positions, moves, or sequence.

Other examples of prior art for presentation of board game information within the internet browser environment include a typical JAVA applet-based board game (applet is a program written in the JAVA programming language that can be included in an HTML page, much in the same way an image is included) display program which has many of the same defects mentioned above for specialized computer applications; namely, the "add-on" or "plug-in" must be available for the hardware, operating system, and the browser used. It must then be downloaded, configured, and maintained by the end-user. In the case of an embedded JAVA application, again, the end-user's computer must have the appropriate JAVA environment installed, and the application ("applet") must be downloaded to the user's computer. Further, the applet permits the display of board game figures only, requiring the use of HTML to provide the commentary. Again, this limits the two-way integration between figure and commentary that is crucial to the seamless presentation of board game material on-line. All these restrictions severely limit the application of these solutions.

At the same time, some igo and other board game commentary has been made available for computer-based consumption primarily using the HTML format used by Internet browsers. Providing igo commentary in HTML format has an advantage in that no specialized software is required to be downloaded, installed, configured, maintained, or updated by the end user as it can be viewed using virtually any Internet browser. However, in the prior art we find no use of the scripting language-based programmability of Internet browsers in order to provide animated go diagrams, or diagrams tied to any narrative discussion. Instead, the images are inevitably static, with the same defects inherent in using printed media.

The features and advantages of the present invention will be presented in more detail in the following specification of the invention and the figures.

DESCRIPTION OF THE DRAWINGS

FIG. 2 shows an image definition portion of authored document;

FIG. 3 shows an interrelated text and image portion of the authored document;

FIG. 4 shows a portion of the second encoded representation in HTML;

DETAILED DESCRIPTION OF THE INVENTION

Figure 1:
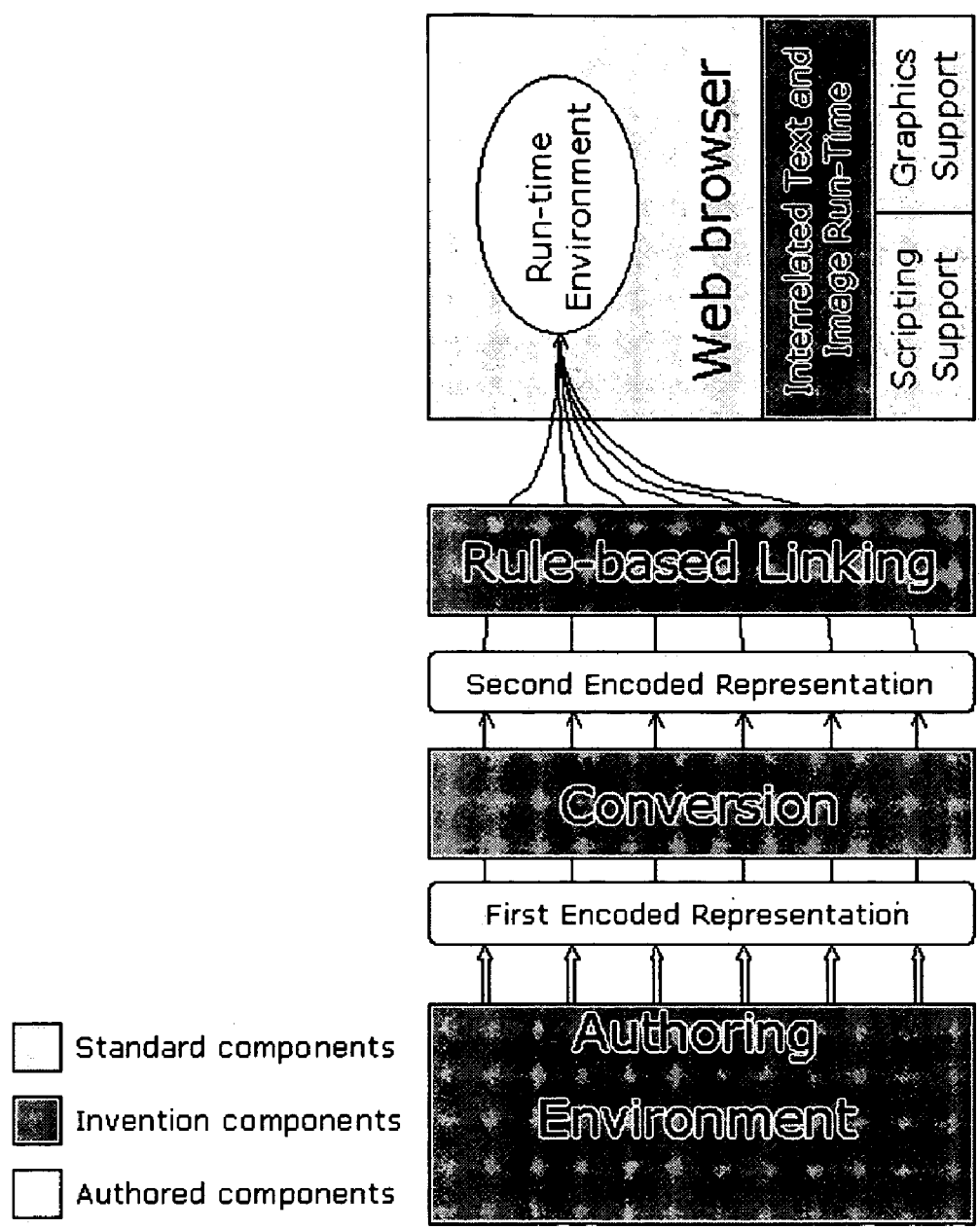
FIG. 1 is a flow chart of the invention.
Figure 5:
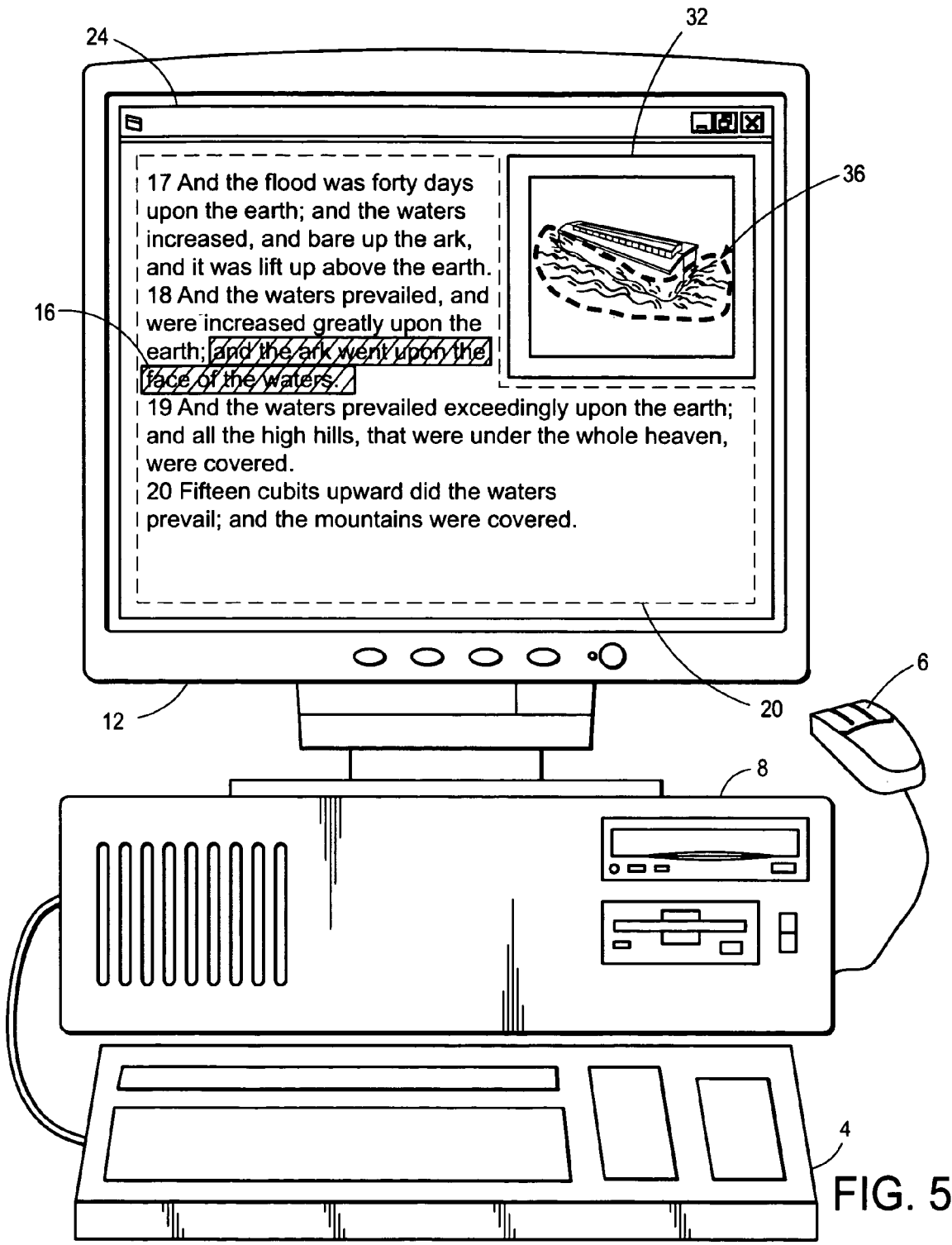
FIG. 5 shows information displayed in a consumable format within the run-time environment.
Figure 6:
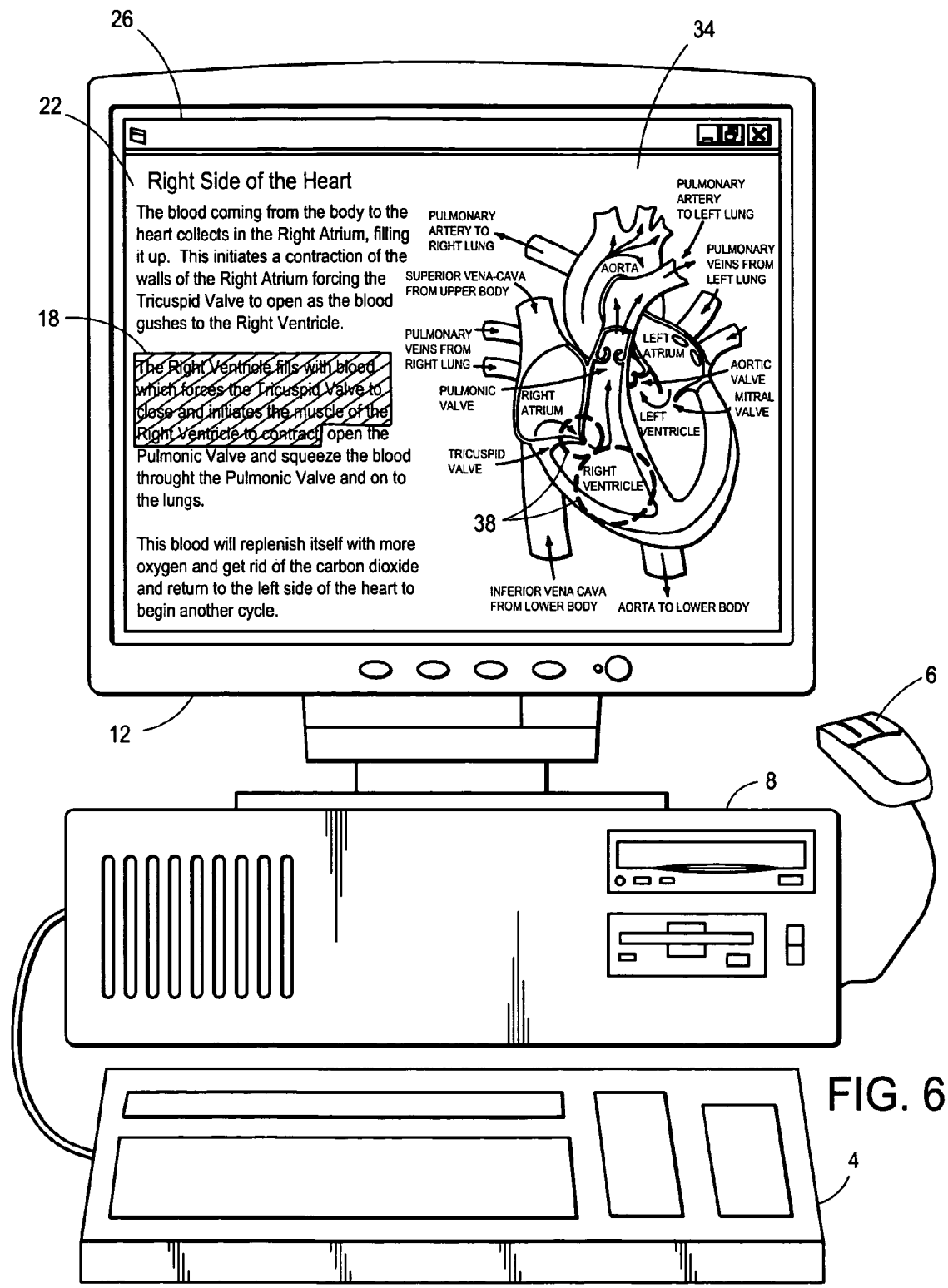
FIG. 6 shows information displayed in a consumable format within the run-time environment.

The present invention resides in a computer-based method for conveying interrelated information. As shown in FIG. 1, the computer-based method for conveying interrelated information includes the following steps. Organizing information according to an information model within an authoring environment. The information is then placed in the form of a first encoded representation. The first encoded representation is converted into a second encoded representation suitable for use in a run-time environment. As shown in FIGS. 1, 5 and 6, the second encoded representation is presented in an interactive, consumable format in the run-time environment, shown as 24 and 26 in FIGS. 5 and 6, respectively.

As shown in FIGS. 2 and 3, an author creates a document within the authoring environment. A document is the top unit into which an author organizes information. The document contains at least one media section. As shown in FIG. 6, a media section is a grouping of information of a particular media type. The media type is selected from the group of media types including text 22, image 34, video or audio. The media section is provided with information governing the position of its display within the screen or window of the run-time device.

As shown in FIG. 5, a media section is composed of at least one element. An element is a unit of information.

A text element 16 is selected from the group including a paragraph, a sentence, a phrase, a single word, a single character, or as the author designates.

As shown in FIG. 5, three aspects define an image element 36 in a media section 32. The first aspect is the image displayed. The second aspect is the position of the image. The third aspect is a subset of the image. The image is selected from the group including a file of any standard graphics format such as PNG (Portable Network Graphics, an extensible file format for the loss-less, portable, well-compressed storage of raster images), BMP (bitmap graphics-file formats used by the Microsoft Windows operating system), JPEG (image compression software), GIF (providing access to an interactive computer data base for use in compression, transmission and interchange in the field of computer graphics) including animated GIF, an SVG (Scalable Vector Graphics) graphics file, a file of a standard video format such as QUICKTIME (computer software for graphical applications, namely, for the creation, delivery, editing and viewing of digital media, namely, video, sound, animation, graphics, text, music and virtual reality.), MPEG (computer operating software programs for recording, transmitting, amplifying, reproducing, encoding, decoding, compressing and decompressing sound, images, and data signals), or MACROMEDIA FLASH (computer software for creating animation, sound, graphics, presentations, and illustrations; computer software for viewing and playing animation, sound, graphics, presentations, and illustrations; computer software for use in authoring for the web; computer software for enhancing the capabilities of web browser software) file, a snippet of text, or a graphic object. A snippet of text is a short piece of text, such as a letter, word, number, or phrase used as a graphic element in a graphic (image) context. A graphic object is a line, a circle, a square, rectangle, polygon, Bezier curve, or other geometric shape. The position specifies the location at which the image is to be displayed in relation to the media section or another element of such media section. The subset is designated by spatial, and in the case of video elements, temporal parameters. The spatial parameters mathematically define pixel regions. The temporal parameters mathematically define time ranges and playback speed, including a single frame of video, a range of video frames, or the entire video from start to finish. In an SVG graphic, the subset may be designated as a sub-object within the graphic. The image media section as a whole may be constructed so as to represent a common graphic type such as a map, diagram, or timeline.

The element of audio is a range of time within the audio media section designated by a starting and an ending time.

The details of organizing information according to an information model within the authoring environment further include the step of establishing links between the elements in the various media sections. As shown in FIG. 6, a link is a relationship between elements, such that at run-time a link from a first element 18 to a second element 38 causes the second element 38 to receive secondary focus when the first element receives primary focus.

In one version of the invention, the links are established by specifying directly which elements are to be linked from which other elements. In another version of the invention, the links are established via a rule-based mechanism, by the following steps: Assigning one or more descriptions to each element. Assigning rules to each element.

Descriptions describe the nature of the element to which they are assigned. Descriptions are selected from the group including single identifiers, identification numbers, and more complex structures. Rules define the conditions for linking elements together. Thus at run-time, the elements whose description satisfies a rule are given secondary focus when the element with that rule receives primary focus. A compound rule may be given, made up of a group of rules all of which or any one of which must be satisfied for the compound rule as a whole to match.

Elements may further specify elements on which they depend, and which thus must be displayed in advance at run-time to maintain the sequential integrity of the media section presentation. The author may specify that the information consumer be alerted at run-time, by an appropriate mechanism, to the presence of un-displayed elements dependent on a particular displayed element.

Transforming codes are used to convert the first encoded representation into a second encoded representation for use in the run-time environment. In one version of the invention, the conversion is carried out once, in advance. In another version of the invention, the conversion takes place on demand. In yet anther version of the invention, the run-time environment directly supports the first encoded representation and so no conversion is required.

As shown in FIG. 4, in a variation of the invention, the output of the conversion into the second encoded representation is in HTML, WML, or similar mark-up language. As shown in FIG. 1, the second encoded representation is then run on a standard Internet browser as the run-time environment.

A version of the invention intended for use on specialized computing devices in the run-time environment, uses a specially adapted second encoded representation. In other versions of the invention, the conversion in the second encoded representation is into a format selected from the group consisting of Portable Document Format (PDF), MACROMEDIA FLASH, SVG, and other appropriate formats. The document could be consumed in any environment that supports the output format.

In the version of the invention using descriptions and rules for specifying element links, the details of converting the first encoded representation into a second encoded representation include a further step. The descriptions and rules assigned to elements are analyzed to determine which elements are linked to each other. The results of this analysis are included in the second encoded representation.

In the version of the invention intended for run-time use on a standard World-Wide Web browser or similar run-time delivery platforms, the details of converting the first encoded representation into a second encoded representation further involve incorporating scripting language-based calls into the second encoded representation. The calls invoke pre-defined functionality contained in the run-time environment portion of the invention.

The details of interacting with an information consumer to present the second encoded representation in a run-time environment include the steps of initiating the run-time environment software and selecting the document that the information consumer wishes to view.

The run-time environment is couched within a computer-based system used by an information consumer to view the interlinked narrative/image information. The document to be viewed is selected by any method typically employed in a computer environment to invoke a Uniform Resource Locator (URL) designating the second encoded representation, and optionally the media section of initial interest, the element to receive initial primary focus, and other run-time options.

As shown in FIGS. 5 and 6, the computer-based system used by an information consumer to view the interlinked narrative/text information is selected from the group including a desktop 8, a laptop, a handheld, a mobile phone, a game machine, a electronic book reader, a wearable computer, an application-specific device, or any other device with the requisite processing power, display, sound production component, and software. A display device 12 or a window 24 or 26 designated by the author or the information consumer displays the document. The author specifies the configuration and the format of the consumable end product presented in the run-time environment.

Media sections are displayed in the run-time environment interaction with the information consumer. The display of a media section includes the title of the media section, the content of the media section, a navigational tool, a hint indicator, and a list of elements with secondary focus. The media section is displayed at a location within an author-specified window on the computer display 12. The navigational tool provides controls permitting the information consumer to manually or automatically control movement through the elements comprising the media section. The hint indicator denotes the presence of a hidden element. The list of elements with secondary focus lists elements in the media section receiving secondary focus and permits the information consumer to select one of them and bring it into view.

The contents of each element comprising the media section can be displayed. Displaying an element includes displaying the element's content, and indicators showing the presence of un-displayed elements dependent on that element, if applicable.

As shown in FIG. 5, a further step in interacting with an information consumer to present the second encoded representation in a run-time environment is to select the media section 20 to be of primary interest. The selection may be indicated visually or through audio means. The information consumer may then commence automated movement through the elements of that media section, if the author established this capability. The selection of the media section of primary interest occurs by the information consumer selecting from an media section list or menu, or employing keyboard commands or user interface elements, such as a mouse 6, to move among available media sections.

As shown in FIG. 6, the details of interacting with an information consumer to present the second encoded representation in a run-time environment include the further steps of certain elements receiving focus, and audio-visually indicating that focus 18. The method of audio-visually indicating focus on an element is selected from the group including flashing the element, moving the element, outlining the element, drawing a geometric shape around the element, displaying an arrow pointing to the element, displaying a box, circle, other geometric shape, or other display item such as text or sequence number near or around the element, playing the element in the case where it has an audio-video component, applying some graphical transformation of the element, changing the color of the element, its font, its size, displaying an alternative version of the element, changing any other attribute of the element, or repeating any of the above activation techniques two or more times for additional emphasis.

The details of interacting with an information consumer to present the second encoded representation in a run-time environment include the further steps of selecting or moving to an element of primary focus, and audio-visually indicating that element. An element may receive primary focus by a means selected from the group including direct mouse 6 selection of the element, information consumer operation of a navigational tool, information consumer operation of the keyboard 4, automated movement, matching a search request initiated by the information consumer, automated detection of location of the information consumer's eyes, or other similar mechanism. In the case of automated movement, the automated movement may commence upon selection of a media section of the primary interest, or upon information consumer command. The speed of the automated movement may be increased or decreased by user command. Further user commands are available to pause, restart, or reverse the automated movement.

As shown in FIG. 5, the details of placing focus on elements include the further steps of giving secondary focus to all the elements 36 linked to an element with primary focus 16. Then, finding the elements thus receiving secondary focus within a dependency sequence. Next, focusing or defocusing upon other dependency sequence elements as necessary. Next, indicating the elements having received secondary focus audio-visually. Finally, placing the elements having received secondary focus in the media section's list of elements with secondary focus.

Although specific embodiments of the present invention have been described with reference to the drawings, it should be understood that such embodiments are by way of example only and merely illustrative of but a small number of the many possible specific embodiments that can represent applications of the principles of the present invention. Various changes and modifications obvious to one skilled in the art to which the present invention pertains are deemed to be within the spirit, scope and contemplation of the present invention as further defined in the appended claims.

What is claimed is:

1. A method of using a computer to convey related information of a recipe comprising:
- identifying one or more text elements related to the recipe;
- identifying one or more image elements related to the recipe, each identified one or more image element including an image, image display position information;
- selecting one or more of the identified text elements for inclusion in one or more text media sections, each of the one or more text media sections further including display position information;
- selecting one or more of the identified image elements for inclusion in one or more image media sections, each of the one or more image media sections further including display position information;
- organizing a first subset of the identified one or more image media elements into sequences corresponding to steps and/or ingredients in a recipe;
- organizing one or more alternate subsets of the identified one or more image media elements into one or more alternate sequences corresponding to alternate steps and/or ingredients in a recipe;
- linking each of the identified one or more text elements to one or more of the identified one or more text elements, or one or more of the identified one or more image elements;
- linking each of the identified one or more image elements to one or more of the identified one or more text elements, or one or more of the identified one or more image elements according to the first subset or the one or more alternate subsets;
- forming an authored document by combining text media sections containing linked text elements with image media sections containing linked image elements;
- transforming the authored document into a run-time file using transforming codes;
- activating the run-time file; and
- selecting a transformed image or text element from the run-time file, the selected, transformed image or text element and all linked transformed image or text elements being highlighted.

* * * * *